United States Patent
Choi (10) Patent No.: US 10,742,020 B2
(45) Date of Patent: Aug. 11, 2020

(54) OVER-VOLTAGE PROTECTION DEVICE OF GENERATOR AND METHOD FOR ENHANCING OVER-VOLTAGE PROTECTION FUNCTION

(71) Applicants: Hyundai Motor Company, Seoul (KR); Kia Motors Corporation, Seoul (KR)

(72) Inventor: Nak-Young Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 440 days.

(21) Appl. No.: 15/839,357

(22) Filed: Dec. 12, 2017

(65) Prior Publication Data
US 2019/0115747 A1 Apr. 18, 2019

(30) Foreign Application Priority Data
Oct. 17, 2017 (KR) .................. 10-2017-0134406

(51) Int. Cl.
*H02H 7/06* (2006.01)
*H02P 9/26* (2006.01)
*H02P 9/04* (2006.01)
*H02P 9/10* (2006.01)
*H02P 29/024* (2016.01)

(52) U.S. Cl.
CPC .............. *H02H 7/065* (2013.01); *H02P 9/04* (2013.01); *H02P 9/10* (2013.01); *H02P 9/26* (2013.01); *H02P 29/0241* (2016.02)

(58) Field of Classification Search
CPC ....... H02H 7/065; H02P 29/0241; H02P 9/26; H02P 9/04; H02P 9/10
USPC .................... 361/18–21, 91.1–91.9
See application file for complete search history.

(56) References Cited

U.S. PATENT DOCUMENTS

| | | | |
|---|---|---|---|
| 2012/0182648 A1* | 7/2012 | Maddali | H02H 7/065 361/21 |
| 2012/0303189 A1* | 11/2012 | Namuduri | B60W 10/06 701/22 |
| 2014/0168825 A1* | 6/2014 | Patel | H02H 7/065 361/21 |

FOREIGN PATENT DOCUMENTS

KR 2008-0031815 A 4/2008

* cited by examiner

*Primary Examiner* — Dharthi H Patel
(74) *Attorney, Agent, or Firm* — Mintz Levin Cohn Ferris Glovsky and Popeo, P.C.; Peter F. Corless (57) ABSTRACT

A method for enhancing an over-voltage protection by an over-voltage protection device for a generator is provided. The device includes a high voltage excitation off (HEO) circuit lowering an over-voltage level by an over-voltage lockout control value and a voltage-dependent Ki-Kp (VoKiKp) circuit 30 decreasing an over-voltage generation time by a voltage difference value of a battery voltage. A generator setting voltage is provided to operate the over-voltage and the voltage difference value of the generator 1. The over-voltage level is lowered and the over-voltage generation time is minimized, thereby enhancing the over-voltage protection of the regulator of the generator.

15 Claims, 5 Drawing Sheets

OVER-VOLTAGE PROTECTION DEVICE OF GENERATOR AND METHOD FOR ENHANCING OVER-VOLTAGE PROTECTION FUNCTION

CROSS-REFERENCE TO RELATED APPLICATIONS

This application claims priority to Korean Patent Application No. 10-2017-0134406, filed on Oct. 17, 2017, which is incorporated herein by reference in its entirety.

BACKGROUND

Field of the Disclosure

The present disclosure relates to a generator, and more particularly, to a method for enhancing an over-voltage protection for an over-voltage protection circuit of a generator for a vehicle including an industrial generator and a power supply system.

Description of Related Art

Generally, a power supply system or an alternating current (AC) generator for a vehicle including an industrial generator requires a circuit to protect against an over-voltage that may be instantaneously generated in the circuit during release of electrical load after an operation of the electrical load. Accordingly, the circuit is implemented by an over-voltage protection circuit of a regulator. For example, the over-voltage protection circuit of the regulator implements a control of a current amount through a field coil that generates a magnetic field of a rotor portion and voltage regulation through a zener diode.

The over-voltage protection function may be limited to the operation of the current amount of the field coil and the voltage regulation of the zener diode, and attempts to lower an over-voltage level or minimize an over-voltage generation time are difficult to accomplish. As a result, a generator using the circuit against over-voltage has a limitation in that a protection function of the over-voltage instantaneously generated in the circuit at the time of release of sudden large electrical load after an operation of the electrical load is insufficient.

The matters described as the related art have been provided merely for assisting in the understanding for the background of the present disclosure and should not be considered as corresponding to the related art known to those skilled in the art.

SUMMARY

An object of the present disclosure provides an over-voltage protection circuit of a generator and a method for enhancing an over-voltage protection. In particular, a high voltage excitation off (HEO) is capable of decreasing an over-voltage level by assigning a setting value of an over-voltage lockout control value and a voltage-dependent Ki-Kp (VoKiKp) capable of minimizing an over-voltage generation time by a specific voltage difference valve at the time of generation of over-voltage are implemented. Accordingly, the over-voltage protection function of a regulator of the generator by the balanced HEO and VoKiKp may be enhanced.

In accordance with an exemplary embodiment of the present disclosure, an over-voltage protection device of a generator may include a high voltage excitation off (HEO) circuit configured to operate an over-voltage generated in the generator and a voltage-dependent Ki-Kp (VoKiKp) circuit. The HEO function circuit may be configured to decrease an over-voltage level by an over-voltage lockout control value. The VoKiKp function circuit may be configured to decrease an over-voltage generation time by a voltage difference value.

In some exemplary embodiments, the over-voltage lockout control value may be a selected over-voltage lockout setting value and the over-voltage lockout setting value may control instantaneous generation to 0% by 0% EXC_duty by excitation off. The voltage difference value may be a difference between a battery voltage and a generator setting voltage. The voltage difference value may be reflected to electrical load sensitivity representing a change in the generator setting voltage with respect to a time to decrease the over-voltage generation time.

Additionally, the HEO circuit and the VoKiKp circuit may have an analog to digital converter (AC/DC) component, a parameter set (PARA_SET) component configured to receive F_Para which is a KiKp control factor, a proportional-integral (PI) component configured to receive a generator setting voltage and a battery voltage, a pulse width modulation (PWM) component configured to output PWM, and an excitation (EXC) component configured to output an output voltage as an EXC_duty value as common elements. The HEO circuit may be connected to the PWM component, and the VoKiKp circuit may be connected to the PARA_SET component.

The HEO circuit and the VoKiKp circuit may be operated by an over-protection controller. The over-protection controller may be configured to detect the over-voltage level of the over-voltage to operate the HEO circuit, and detect the voltage difference value to operate the VoKiKp circuit. The over-protection controller may be associated with an HEO map and a VoKiKp map, in which an over-voltage lockout setting value applied to the over-voltage lockout control value and a change in the generator setting voltage with respect to a time are indicated to apply a bit value to electrical load sensitivity applied to the voltage difference value.

In accordance with another exemplary embodiment of the present disclosure, a method for enhancing an over-voltage protection function may include when over-voltage information is detected by an over-protection controller after an operation of electrical load of a generator, performing an over-voltage level lowering control of a high voltage excitation off (HEO) circuit using an over-voltage lockout control value; and performing an over-voltage generation time minimization control of a voltage-dependent Ki-Kp (VoKiKp) circuit using a voltage difference value of a battery voltage and a generator setting voltage. The over-voltage level lowering control and the over-voltage generation time minimization control may be maintained until the over-voltage is resolved.

The performing of the over-voltage level lowering control may include detecting, whether an over-voltage level of the over-voltage reaches an HEO setting value; selecting a non-voltage memory (NVM)-parameter indicating a change in a generator setting value with respect to a time as HEO NVM-RPARA_SEL according to the over-voltage level, turning excitation off by the HEO NVM-RPARA_SEL, stopping instantaneous generation of the generator by an EXC_duty value of 0% by the excitation off and maintaining the EXC_duty value to be 0% until the over-voltage level is decreased below the HEO setting value.

The performing of the over-voltage generation time minimization control may include determining whether the voltage difference value equals a setting voltage difference value, detecting a current generation sensitivity index as the NVM-parameter indicating a change in the generator setting voltage with respect to a time when the voltage difference value and the setting voltage difference value equal each other, selecting the NVM-parameter as VoKiKp NVM-RPARA_SEL according to the voltage difference value, converting the current generation sensitivity index into a changed generation sensitivity index by the VoKiKp NVM-RPARA_SEL decreasing an over-voltage exposure time by the changed generation sensitivity index and maintaining the adjusted generation sensitivity index until the voltage difference value does not equal the setting voltage difference value.

The NVM-parameter may be divided into n setting voltage values to be a bit value and selected as the HEO NVM-RPARA_SEL. The NVM-parameter may be divided into n setting voltage difference values to be a bit value and may be selected as the VoKiKp NVM-RPARA_SEL.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Terms and words used in the present specification and claims are not to be construed as a general or dictionary meaning but are to be construed as meaning and concepts meeting the technical ideas of the present disclosure based on a principle that the inventors can appropriately define the concepts of terms in order to describe their own disclosures in best mode. Therefore, the configurations described in the embodiments and drawings of the present disclosure are merely most preferable embodiments but do not represent all of the technical spirit of the present disclosure. Thus it should be understood that there may exist various equivalents and modifications for substituting those at the time of filing this application.

Hereinafter, embodiments of the present disclosure will be described in detail with reference to the accompanying drawings, and the embodiments may be modified in various different ways by a person having ordinary skill in the art to which the present disclosure pertains, thus the present disclosure is not limited to the embodiments described herein.

Figure 1:
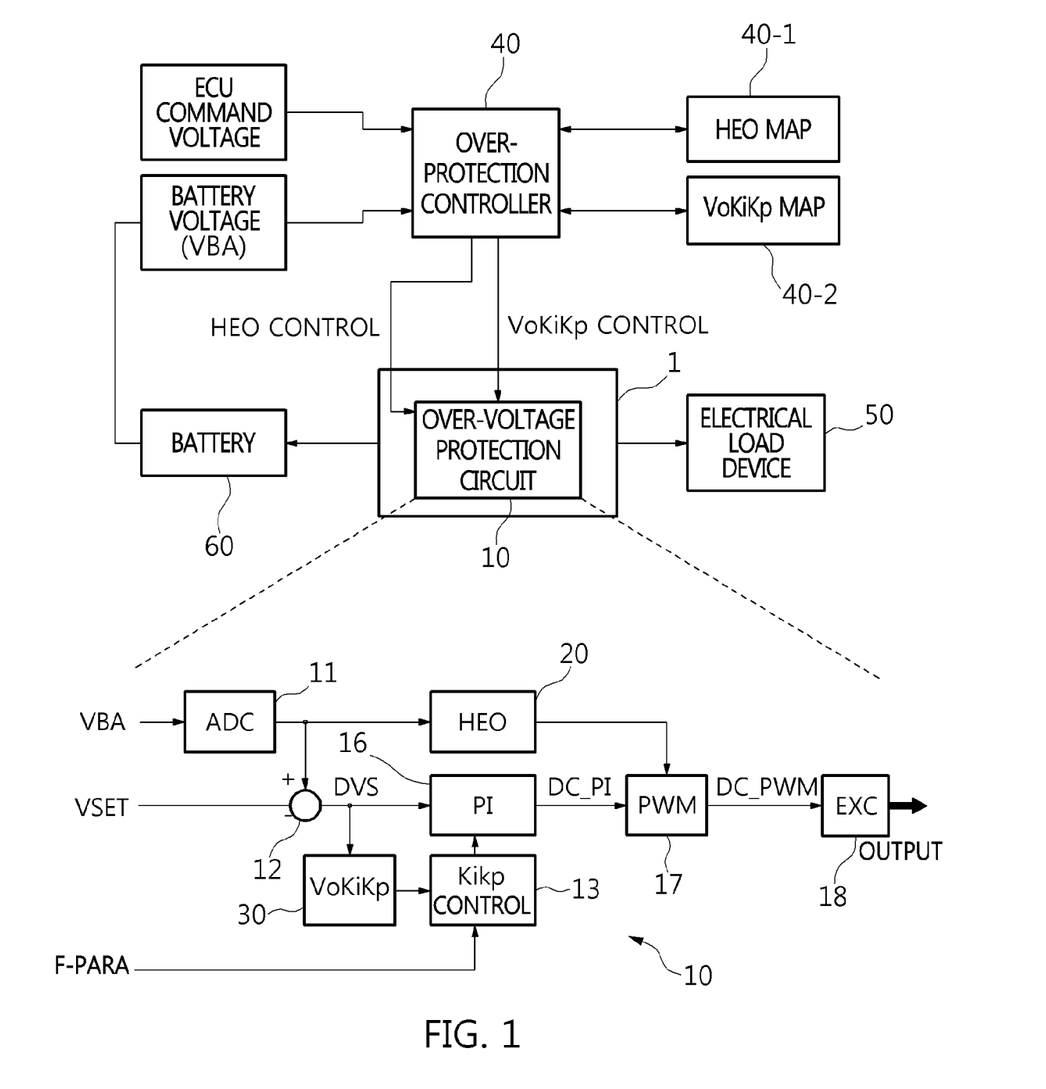
FIG. 1 is an exemplary configuration diagram of an over-voltage protection device of a generator according to an exemplary embodiment of the present disclosure.

Referring to FIG. 1, a generator 1 may include an over-voltage protection device 10 for a generator (hereinafter, referred to as generator over-voltage protection device) that forms electric circuits for an electrical load device 50 and a battery 60, respectively, and an over-protection controller 40. In particular, the generator 1 may include a generator controller (not illustrated) configured to perform communication with the over-protection controller 40. The generator controller may provide over-voltage information in a circuit at the time of release of large electrical load after an operation of the electrical load to the over-protection controller 40 together with ECU command voltage information. Additionally, revolutions per minute (RPM) information including idle RPM for the electrical load device 50 may be provided to the over-protection controller 40, when operating a circuit element of the generator over-voltage protection device 10. In particular, a high voltage excitation off (HEO) and a voltage-dependent Ki-Kp (VoKiKp) of the over-protection controller 40 each configure a setting value for a non-voltage memory (NVM)-parameter, thereby expanding a degree of freedom based on a selection by a user.

In particular, the generator over-voltage protection device 10 may include a HEO circuit 20 and a VoKiKp circuit 30 together with an analog to digital converter (AC/DC) component 11, a summation (SUM) component 12, a parameter set (PARA_SET) component 13, a proportional-integral (PI) component 16, a pulse width modulation (PWM) component 17, and an excitation (EXC) component 18.

For example, the ADC component 11 may be configured to convert a battery voltage (VBA) input from the battery 60 to digital to be output to each of the PARA_SET component 13 and the HEO circuit 20. The SUM component 12 may be configured to receive a generator set voltage VSET (e.g., ECU command voltage of the generator controller) and may be configured to generate dynamic voltage scaling (DVS) by a combination with VBA output of the ADC component 11 to each of the PI component 16 and the VoKiKp circuit 30. The PARA_SET component 13 may be configured to generate input F_parameter (F_Para) (e.g., KiKp control factor of setting value) to the PI component 16 in association with the VoKiKp circuit 30. The PI component 16 may be configured to receive the DVS of the SUM component 12 and generate dynamic voltage_proportional-integral (DC_PI) by a combination with the F_Para of the PARA_SET component 13. The PWM component 17 may be configured to receive the DC_PI of the PI component 16 and generate dynamic voltage_pulse width modulation (DC_PWM) by a combination with the output of the HEO circuit 20. The EXC component 18 may be configured to generate output voltage (generator output voltage) as an EXC_duty value by the DC_PWM.

For example, the HEO circuit 20 may include in addition to the HEO operation of adjusting over-voltage, a variable over-voltage lockout control value control operation of decreasing an over-voltage level by a sellable over-voltage lockout control value, unlike an existing control in which a voltage lockout control value is fixed. In particular, the HEO operation includes adjusting over-voltage through blocking of current supply to a rotor (e.g., a motor of the generator 1) by making the EXC_duty value to 0% when reaching an HEO setting value. The VoKiKp circuit 20 may include minimizing an over-voltage generation time using a specific difference value of the VBA value with respect to the VSET value during generation of over-voltage.

The over-protection controller 40 may include an HEO map 40-1 and a VoKiKp map 40-2, and may be configured to operate the VoKiKp circuit 30 to minimize the over-voltage generation time while operating the HEO circuit 20 to reduce the over-voltage level for enhancing the over-voltage protection function in the circuit of the generator over-voltage protection device 10. For example, the HEO map 40-1 as an HEO NVM-RPARA_SEL list may be configured to store the NVM-parameter, and the VoKiKp map 40-2 as a VoKiKp NVM-RPARA_SEL list may be configured to store the NVM-parameter. In particular, each of the HEO NVM-RPARA_SEL list and the VoKiKp NVM-RPARA_SEL list may be determined by a value from 2 bits to many bits.

Figure 2:
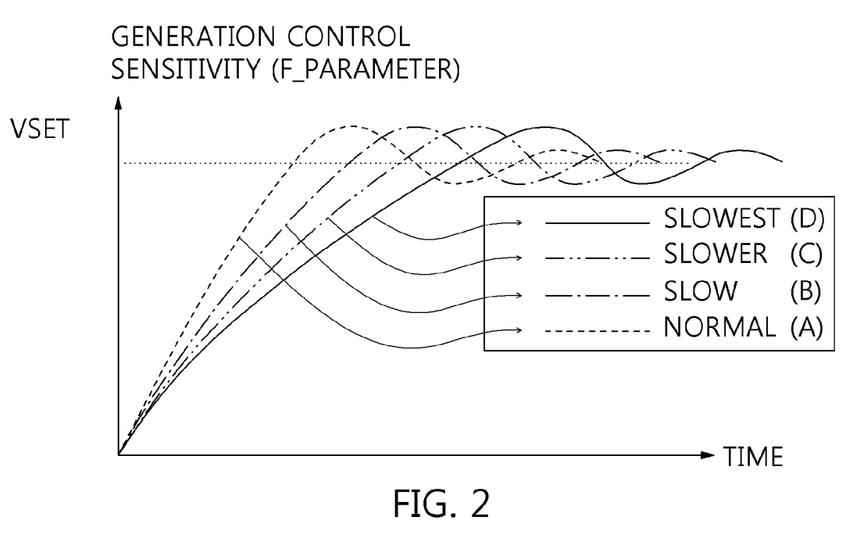
FIG. 2 is an example of a non-voltage memory (NVM)-parameter (generation sensitivity factor) applied to the over-voltage protection device of a generator according to an exemplary embodiment of the present disclosure.

FIG. 2 illustrates an example in which the NVM-parameter may divide a change in the VSET with respect to a time into a four-stage generation sensitivity index. In particular, the four-stage generation sensitivity index may be divided into Slowest, Slower, Slow, and Normal. Slowest is defined as a maximum insensitive state, Slower is defined as a medium-insensitive state, Slow is defined as an insensitive state, and Normal is defined as a sensitive state.

Accordingly, the VoKiKp circuit 20 may include minimizing an over-voltage generation time using a difference value of the VBA value with respect to the VSET value at the time of generation of over-voltage. For example, minimizing the over-voltage generation time may be implemented when the respective functions of the HEO NVM-RPARA_SEL of the HEO function circuit 20 and the VoKiKp NVM-RPARA_SEL of the VoKiKp function circuit 30 are operated to be Slowest for an idle RPM condition (e.g., motor of the generator 1) of Slowest and the electrical load sensitivity of Normal, the control state of Slowest is changed to Normal by generation of a specific difference value or more of the VBA value with respect to the VSET value as a VoKiKp entry condition. Then, the control state of Normal may be configured to adjusted to Slowest again by generation of the difference value or less of the VBA value with respect to the VSET value as a VoKiKp release condition.

Accordingly, the generator over-voltage protection device 10 may adjust an an output voltage by reducing the over-voltage level and minimizing the over-voltage generation time by inputting the battery voltage VBA and the generator setting value VSET as input data, and associating the NVM-parameter associated with the F_Para with the HEO circuit 20 and the VoKiKp circuit 30.

Figure 3:
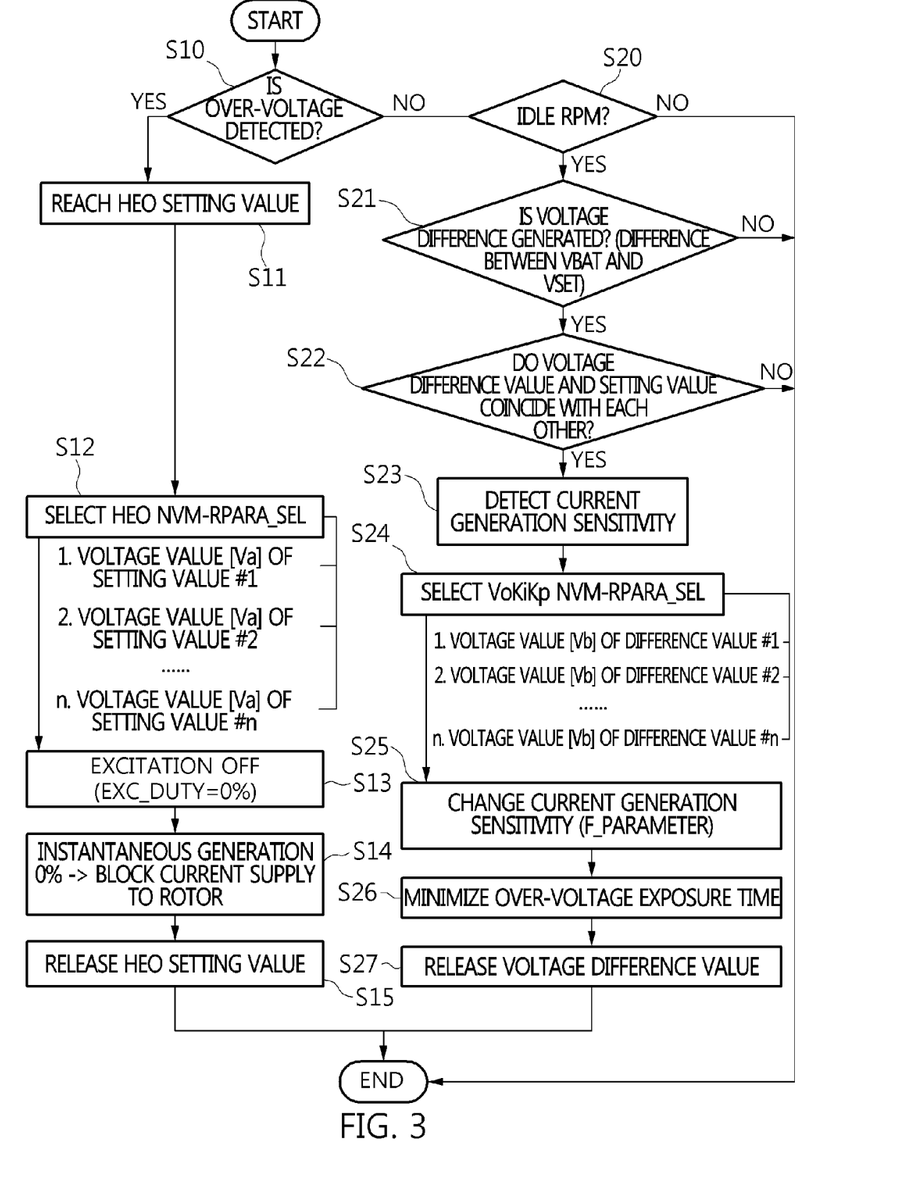
FIG. 3 is an exemplary flowchart of a method for enhancing an over-voltage protection function of a generator according to an exemplary embodiment of the present disclosure.

FIG. 3 illustrates an exemplary method for enhancing an over-voltage protection function, in which the over-protection controller 40 may be configured to perform communication with the generator controller while being associated with the HEO map 40-1 and the VoKiKp map 40-2 may be a control subject, and the HEO circuit 20 and the VoKiKp circuit 30 of the generator over-voltage protection device 10 may be a control object. As illustrated in FIG. 3, the method for enhancing an over-voltage protection function may be implemented by an over-voltage level lowering control (S10 to S15) according to an over-voltage detection condition, and an over-voltage generation time minimization control (S20 to S27) according to a voltage difference detection condition at the time of idle revolution (idle RPM). In particular, the over-voltage level lowering control (S10 to S15) may be implemented by an over-voltage detection operation (S10), an HEO setting recognition operation (S11), an HEO NVM-RPARA_SEL selection operation (S12), an excitation off operation (S13), an instantaneous generation stop operation (S14), and an HEO setting value release operation (S15).

For example, in the over-voltage detection operation (S10), over-voltage of the over-protection controller 40 may be detected at an over-voltage level by an over-voltage detection signal of the generator controller, and when the over-voltage is not detected, the over-voltage level lowering operation ends when the idle RPM condition is not satisfied S20. The HEO setting recognition operation (S11) may be executed when the over-voltage level reaches an HEO setting value, and the setting of the HEO setting value refers to a range of the over-voltage level controlled by the HEO operation. Therefore, when the level of the currently generated over-voltage reaches the over-voltage level of the HEO setting value, the method initiates an HEO NVM-RPARA_SEL selection operation S12, and the HEO NVM-RPARA_SEL selection according to the over-voltage level may be performed.

For example, in the HEO NVM-RPARA_SEL selection operation (S12), one of n NVM-parameters may be selected as an HEO value of the HEO NVM-RPARA_SEL. The n NVM-parameters may be divided into a first HEO value of a voltage value [Va] of a setting value #1, a second HEO value of a voltage value [Va] of a setting value #2, and an n-th HEO value of a voltage value [Va] of a setting value #n, and each of them corresponds to the over-voltage levels, respectively. Accordingly, the n voltage values [Va] of the setting values #n may provide an advantage that the over-voltage lockout control value may reduce the over-voltage level, unlike the over-voltage lockout control value may be fixed. In particular, a size of the voltage values of the setting values #1 to #n may be a value in which an over-voltage size causing damage varies based on a specification of the generator 1, thus may not be numerically limited in the exemplary embodiment.

In the excitation off operation (S13), an EXC_duty value may be output to 0% according to the selected HEO value. The EXC_duty value may be in a range of about 0 to 100%. The EXC_duty value of 0% may include a no output state, and the EXC_duty value of 100% refers to a maximum output state. In the instantaneous generation stop operation (S14), the EXC_duty value may be 0%, and the generation is stopped as the instantaneous generation may be decreased to 0%, and due to the 0% generation state, current supply to the rotor (e.g., motor of the electrical load device 50) may be stopped. In the HEO setting value release operation (S15), the over-voltage level may be decreased below the HEO setting value, and thus the over-voltage level lowering control ends.

Figure 4:
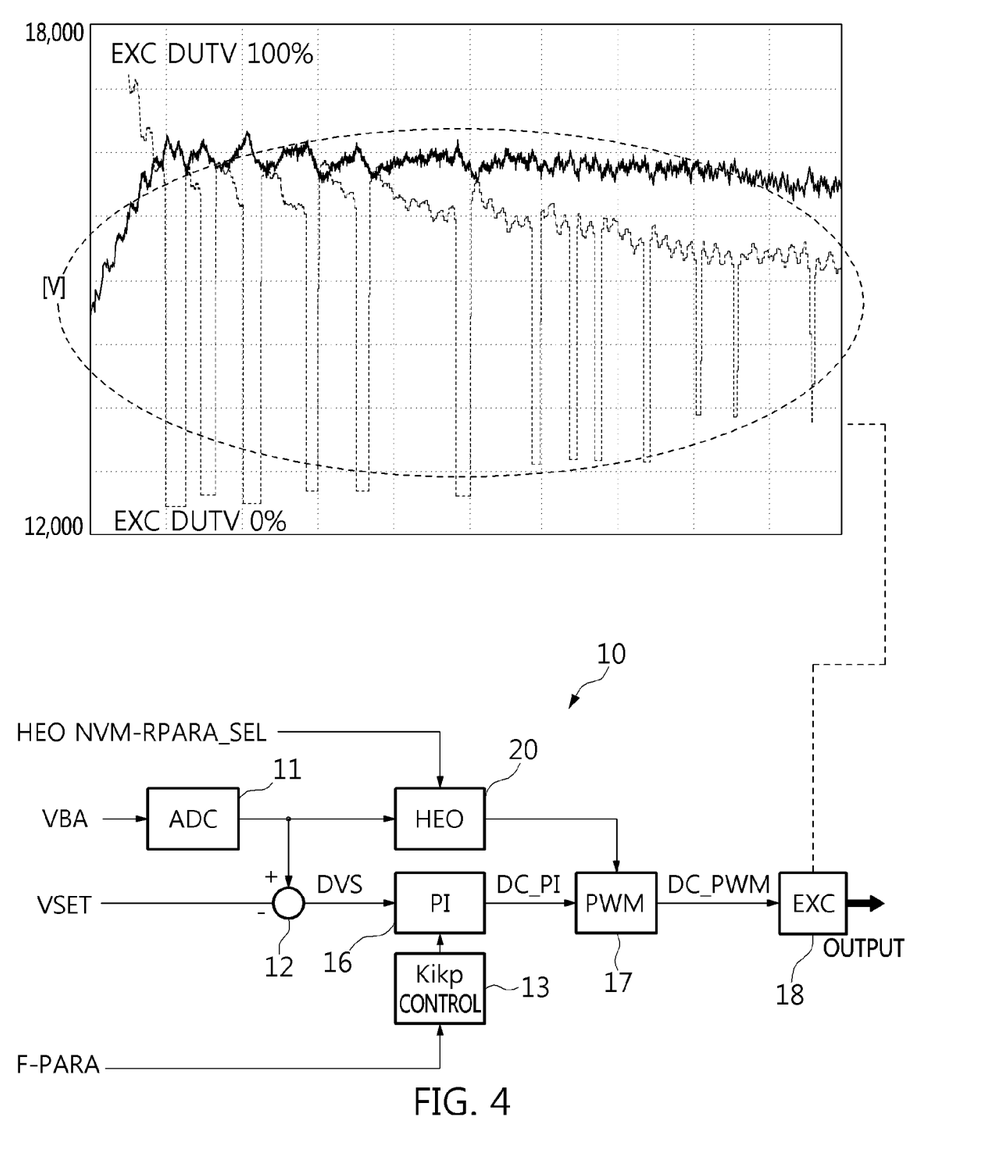
FIG. 4 illustrates an exemplary operation state of an HEO function circuit of the over-voltage protection device of a generator according to an exemplary embodiment of the present disclosure.

FIG. 4 illustrates an exemplary over-voltage protection function of the generator over-voltage protection device 10 according to the over-voltage level lowering control (S10 to S15) of the over-protection controller 40. As illustrated in FIG. 4, the over-protection controller 40 may be configured to operate the HEO circuit 20 by using one HEO NVM-RPARA_SEL selected as an over-voltage level among n NVM-RPARA_SEL as the HEO value for the generation of the over-voltage by the HEO function.

Then, the HEO function circuit 20 may be configured to transmit one HEO NVM-RPARA_SEL to the PWM component 17, and the EXC component 18 may reduce the EXC_duty value to 0% according to the HEO NVM-RPARA_SEL of the PWM component 17. As a result, the EXC component 18 does not output the output voltage due to the EXC_duty value of 0%, in comparison to the EXC_duty value of 100%, thereby implementing the over-voltage protection for protection from the generation of the over-voltage.

In particular, the over-voltage generation time minimization control (S20 to S27) may be implemented by an idle RPM detection operation (S20), a voltage difference generation determination operation (S21), a voltage difference value comparison operation (S22), a current generation sensitivity index detection operation (S23), a VoKiKp NVM-RPARA_SEL selection operation (S24), a current generation sensitivity index change operation (S25), an over-voltage exposure time control operation (S26), and a voltage difference value release operation (S27).

For example, in the idle RPM detection operation (S20), idle RPM may be detected by the over-protection controller 40 by a motor RPM detection signal for the electrical load device of the generator controller, and when the idle RPM is not detected, the over-voltage generation time minimization control ends. In the voltage difference generation determination operation (S21), the over-protection controller 40 may be configured to detect VSET which is an ECU command voltage of the generator controller and VBA of the battery 60 and to determine generation of voltage difference of $V_{BAT}$ and $V_{SET}$ by subtracting VBA from VSET. When the voltage difference is within a setting range, the over-voltage generation time minimization control ends, and when the minimization control does not end the voltage difference above or below the setting range is generated. In particular, the voltage difference value above the setting range may be defined as an entry voltage difference value level, and the voltage difference value below the setting range may be defined as a release voltage difference value level. In the voltage difference value comparison operation (S22), a setting value may be applied to the voltage difference value, and when the setting value and the voltage difference value coincide with each other. When the voltage difference value and the setting value do not equal each other the over-voltage generation time minimization control ends. When the voltage difference value and the setting value equal each other, the method enters the current generation sensitivity index detection operation (s23) to detect a current generation sensitivity index.

For example, in the VoKiKp NVM-RPARA_SEL selection operation (S24), one appropriate VoKiKp NVM-RPARA_SEL of n NVM-parameters may be selected as a change generation sensitivity index for the current generation sensitivity index. The n NVM-parameters may be divided into a first generation sensitivity index of a voltage value [Vb] of a difference value #1, a second generation sensitivity index of a voltage value [Vb] of a difference value #2, and an n-th generation sensitivity index of a voltage value [Vb] of a difference value #n, and each of them may correspond to the entry voltage difference value level or the release voltage difference value level, respectively. Accordingly, the n voltage values [Vb] of the difference values #n may provide a difference of using a specific difference value of the VBA value with respect to the VSET value, unlike the existing over-voltage control method at the time of minimizing the over-voltage generation time. In particular, a size of the voltage values of the difference values #1 to #n may be a value varying according to a specification of the generator 1, thus may not be numerically limited in the exemplary embodiment.

For example, in the current generation sensitivity change operation (S25), the generation sensitivity index may be adjusted (e.g., when the entry voltage difference value level, changed from Slowest to Normal, or when the release voltage difference value level, changed from Normal to Slowest). In the over-voltage exposure time control operation (S26), the over-voltage exposure time may be minimized by the changed generation sensitivity. Due to the generation sensitivity index changed in the voltage difference value release operation (S27), the over-voltage level may be decreased, and resolution of the over-voltage difference value may be achieved with the minimum over-voltage generation time.

Figure 5:
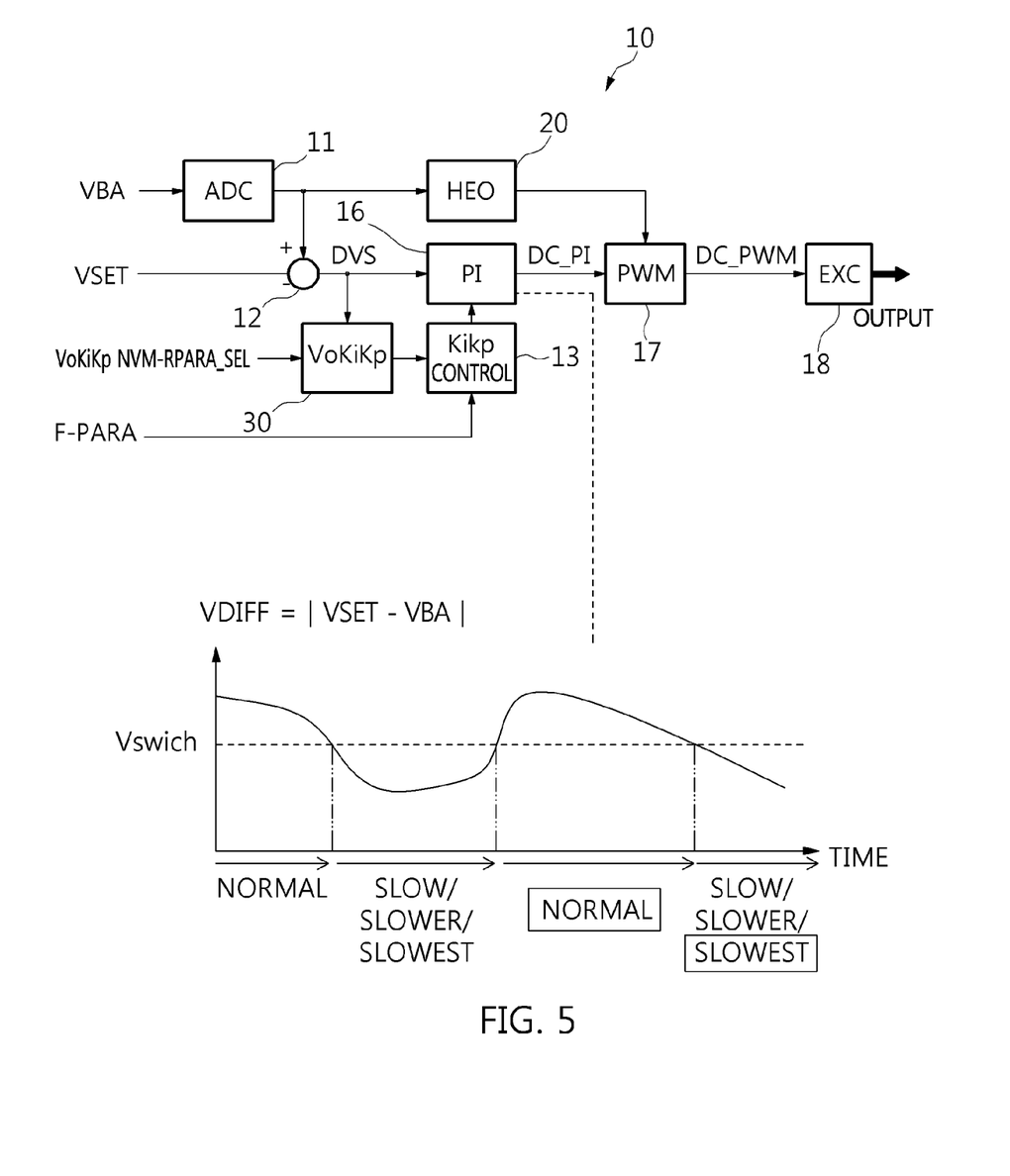
FIG. 5 illustrates an exemplary operation state of a VoKiKp function circuit of the over-voltage protection device of a generator according to an exemplary embodiment of the present disclosure.

FIG. 5 illustrates an exemplary over-voltage generation time minimization function of the generator over-voltage protection device 10 according to the over-voltage generation minimization control (S20 to S27) of the over-protection controller 40. As illustrated in FIG. 5, the over-protection controller 40 may be configured to operate the VoKiKp circuit 30 using one VoKiKp NVM-RPARA_SEL selected as an entry voltage difference value level or a release voltage difference value level among n VoKiKp NVM-RPARA_SEL as the development sensitivity index for the generation of the over-voltage by the VoKiKp operation.

The VoKiKp circuit 30 may be configured to transmit one VoKiKp NVM-RPARA_SEL to the PARA_SET component 13, the PI component 16 may be configured to receive the DVS of the SUM component 12, combine the DVS with the VoKiKp NVM-RPARA_SEL of the PARA_SET component 13, and transmit the combination to the PWM component 17, and the EXC component 18 may be configured to increase or decrease a change rate for a voltage difference value by the adjusted generation sensitivity index as the entry voltage difference value level or the release voltage difference value level according to the VoKiKp NVM-RPARA_SEL of the PWM component 17. As a result, the EXC component 18 may be configured to regulate and generate the output voltage by the adjusted generation sensitivity index, in comparison to the current generation sensitivity index, thereby implementing the over-voltage protection operation for minimizing the over-voltage generation time for the generated over-voltage difference value.

As described above, in the method for enhancing an over-voltage protection function by the generator over-voltage protection device according to the exemplary embodiment, the HEO circuit 20 lowering the over-voltage level by the over-voltage lockout control value and the VoKiKp circuit 30 decreases the over-voltage generation time by the voltage difference value of the battery voltage and the generator setting voltage are provided to operate the over-voltage and the voltage difference value of the generator 1. The over-voltage level may be lowered and the over-voltage generation time may be minimized, thereby enhancing the over-voltage protection function of the regulator of the generator.

In the over-voltage protection circuit according to the present disclosure, the control using the HEO and VoKiKp operations may be performed, to more effectively manage the over-voltage that may be instantaneously generated in the circuit at the time of release of sudden large electrical load of the generator after the operation of the electrical load and enhancing the over-voltage protection. The over-voltage protection circuit according to the present disclosure may be widely used for over-voltage protection of an electric and electronic components used for an industrial generator in addition to a generator for a vehicle and a power supply system.

While the present disclosure has been described with respect to the exemplary embodiments, it will be apparent to those skilled in the art that various changes and modifications may be made without departing from the spirit and scope of the disclosure as defined in the following claims.

What is claimed is:

1. An over-voltage protection device of a generator, comprising:
   a high voltage excitation off (HEO) circuit configured to operate an over-voltage generated in the generator; and
   a voltage-dependent Ki-Kp (VoKiKp) circuit,
   wherein the HEO circuit configured to decrease an over-voltage level by an over-voltage lockout control value, and the VoKiKp circuit configured to decrease an over-voltage generation time by a voltage difference value.

2. The over-voltage protection device of claim 1, wherein the over-voltage lockout control value is a selected over-voltage lockout setting value.

3. The over-voltage protection device of claim 2, wherein the over-voltage lockout setting value adjusts instantaneous generation to 0% by 0% EXC_duty by excitation off.

4. The over-voltage protection device of claim 1, wherein the voltage difference value is a difference between a battery voltage and a generator setting voltage.

5. The over-voltage protection device of claim 4, wherein the voltage difference value is reflected to electrical load sensitivity representing a change in the generator setting voltage with respect to a time to decrease the over-voltage generation time.

6. The over-voltage protection device of claim 5, wherein the electrical load sensitivity is divided into an insensitive state and a sensitive state, and the insensitive state and the sensitive state are divided into four stages.

7. The over-voltage protection device of claim 1, wherein the HEO circuit and the VoKiKp circuit have an analog to digital converter (AC/DC) component configured to receive a battery voltage, a parameter set (PARA_SET) component configured to receive F_Para which is a KiKp control factor, a proportional-integral (PI) component configured to receive a generator setting voltage and the battery voltage, a pulse width modulation (PWM component configured to generate PWM, and an excitation (EXC) component configured to generate an output voltage as an EXC_duty value as common elements, and the HEO circuit is connected to the PWM component, and the VoKiKp circuit is connected to the PARA_SET component.

8. The over-voltage protection device of claim 1, wherein the HEO circuit and the VoKiKp circuit are operated by an over-protection controller, and the over-protection controller is configured to detect the over-voltage level of the over-voltage to operate the HEO circuit, and detect the voltage difference value to operate the VoKiKp circuit.

9. The over-voltage protection device of claim 8, wherein the over-protection controller is associated with an HEO map and a VoKiKp map, and each of the HEO map and the VoKiKp map indicates an over-voltage lockout setting value applied to the over-voltage lockout control value and a change in the generator setting voltage with respect to a time to apply a bit value to electrical load sensitivity applied to the voltage difference value.

10. A method for enhancing an over-voltage protection function, comprising:
    detecting, by an over-protection controller, over-voltage information at the time of release of electrical load after an operation of electrical load of a generator;
    performing, by the over-protection controller, an over-voltage level lowering operation of a high voltage excitation off (HEO) circuit using an over-voltage lockout control value; and
    performing, by the over-protection controller, an over-voltage generation time minimization operation of a voltage-dependent Ki-Kp (VoKiKp) circuit using a voltage difference value of a battery voltage and a generator setting voltage,
    wherein the over-voltage level lowering operation and the over-voltage generation time minimization operation are maintained until the over-voltage is resolved.

11. The method of claim 10, wherein the performing of the over-voltage level lowering control includes:
    determining, by the over-protection controller, whether an over-voltage level of the over-voltage reaches an HEO setting value;
    selecting, by the over-protection controller, a non-voltage memory (NVM)-parameter indicating a change in a generator setting value with respect to a time as HEO NVM-RPARA_SEL according to the over-voltage level;
    turning, by the over-protection controller, excitation off by the HEO NVM-RPARA_SEL;
    stopping, by the over-protection controller, instantaneous generation of the generator by an EXC_duty value of 0% by the excitation off; and maintaining, by the over-protection controller, the EXC_duty value to be 0% until the over-voltage level is decreased below the HEO setting value.

12. The method of claim 11, wherein the NVM-parameter is divided into n setting voltage values to be a bit value and selected as the HEO NVM-RPARA_SEL.

13. The method of claim 10, wherein the performing of the over-voltage generation time minimization control includes:
   determining, by the over-protection controller, whether the voltage difference value coincides with a setting voltage difference value;
   detecting, by the over-protection controller, a current generation sensitivity index as the NVM-parameter indicating a change in the generator setting voltage with respect to a time when the voltage difference value and the setting voltage difference value coincides with each other;
   selecting, by the over-protection controller, the NVM-parameter as VoKiKp NVM-RPARA_SEL based on the voltage difference value;
   converting, by the over-protection controller, the current generation sensitivity index into a changed generation sensitivity index by the VoKiKp NVM-RPARA_SEL;
   decreasing, by the over-protection controller, an over-voltage exposure time by the changed generation sensitivity index; and
   maintaining, by the over-protection controller, the changed generation sensitivity index until the voltage difference value does not coincide with the setting voltage difference value.

14. The method of claim 13, wherein the determination of whether the voltage difference value and the setting voltage difference value are equal to each other is based on idle RPM of the generator.

15. The method of claim 13, wherein the NVM-parameter is divided into n setting voltage difference values to be a bit value and selected as the VoKiKp NVM-RPARA_SEL, n being an integer of 1 or greater.

* * * * *